United States Patent [19]
Schilling et al.

[11] Patent Number: 5,772,749
[45] Date of Patent: Jun. 30, 1998

[54] ANIONIC BITUMINOUS EMULSIONS WITH IMPROVED ADHESION

[75] Inventors: Peter Schilling; Everett Crews, both of Charleston, S.C.

[73] Assignee: Westvaco Corporation, New York, N.Y.

[21] Appl. No.: 929,837

[22] Filed: Sep. 15, 1997

[51] Int. Cl.$^6$ .................................................... C08L 95/00
[52] U.S. Cl. .......................... 106/277; 106/284.4; 524/61
[58] Field of Search ............................... 106/277, 284.4; 524/61

[56] References Cited

U.S. PATENT DOCUMENTS

| | | | |
|---|---|---|---|
| 2,426,220 | 8/1947 | Johnson | 106/223 |
| 2,679,462 | 5/1954 | Monson | 106/223 |
| 2,891,872 | 6/1959 | Voet | 106/239 |
| 3,006,860 | 10/1961 | Heinz | 106/277 |
| 3,062,829 | 11/1962 | Wright et al. | 106/277 |
| 3,108,971 | 10/1963 | Mertens | 106/277 |
| 3,123,569 | 3/1964 | Borgfeldt | 106/277 |
| 3,230,104 | 1/1966 | Falkenberg et al. | 106/277 |
| 3,240,716 | 3/1966 | Mertens | 106/277 |
| 3,245,451 | 4/1966 | Gellman | 152/225 C |
| 3,246,008 | 4/1966 | Evans et al. | 106/269 |
| 3,344,082 | 9/1967 | Montgomery et al. | 106/277 |
| 3,347,690 | 10/1967 | Galvin et al. | 106/269 |
| 3,350,321 | 10/1967 | Conn | 252/351 |
| 3,451,958 | 6/1969 | Riedemann et al. | 524/114 |
| 3,594,201 | 7/1971 | Sommer et al. | 106/277 |
| 3,615,796 | 10/1971 | Schreuders | 106/277 |
| 3,615,797 | 10/1971 | Ohtsuka et al. | 106/278 |
| 3,740,344 | 6/1973 | Ferm | 106/277 |
| 3,766,133 | 10/1973 | Roberts et al. | 524/596 |
| 3,861,933 | 1/1975 | Doi | 106/284 |
| 3,868,263 | 2/1975 | McConnaughay | 106/277 |
| 3,928,061 | 12/1975 | Hellsten et al. | 106/277 |
| 3,941,808 | 3/1976 | Pratt | 525/37.9 |
| 3,947,395 | 3/1976 | Ogata et al. | 427/1.38 |
| 3,956,002 | 5/1976 | Moorer | 106/277 |
| 3,963,509 | 6/1976 | Doi et al. | 106/284.02 |
| 4,088,505 | 5/1978 | Moorer | 106/277 |
| 4,293,459 | 10/1981 | Detroit | 524/76 |
| 4,546,160 | 10/1985 | Brand et al. | 526/320 |
| 4,561,901 | 12/1985 | Schilling | 106/277 |
| 4,639,273 | 1/1987 | Gilmore et al. | 106/282 |
| 4,676,927 | 6/1987 | Schilling et al. | 106/277 |
| 4,789,402 | 12/1988 | Kostusyk | 524/59 |
| 4,806,166 | 2/1989 | Schilling et al. | 106/284.06 |
| 5,194,640 | 3/1993 | Cosgrove et al. | 530/233 |
| 5,208,319 | 5/1993 | Schilling | 530/210 |
| 5,391,636 | 2/1995 | Schilling | 525/381 |
| 5,667,578 | 9/1997 | Schilling | 106/277 |
| 5,670,562 | 9/1997 | Schilling | 529/61 |

FOREIGN PATENT DOCUMENTS 0077632  4/1983  European Pat. Off. .

*Primary Examiner*—Peter A. Szekely
*Attorney, Agent, or Firm*—Daniel B. Reece, IV; Terry B. McDaniel; Richard L. Schmalz

[57] ABSTRACT

This invention relates to rapid set, medium set, and slow set anionic emulsions prepared from straight bitumen or bitumen modified by the incorporation of polymers such as styrene butadiene rubbers (SBR), styrene block copolymers (SBS), ethylene vinyl acetate copolymers (EVA), and other suitable modifiers. The invention also relates to emulsions modified by the incorporation of solvents (such as diesel oil or kerosene) or by the addition of polymer latices (such as SBR-latex or natural rubber latex). More particularly, the invention relates to improved methods for enhancing adhesion between asphalt and aggregate in anionic solventless and solvent-containing bituminous emulsions wherein the emulsifiers are alkali earth salts of tall oil fatty acids, fortified tall oil fatty acids, tall oil rosins, and fortified rosins as well as combinations of kraft lignins and nonionic emulsifiers. The adhesion promoting compositions utilized in these improved methods are produced by reacting tall oil fatty acid and/or modified tall oil fatty acid to yield a polyalkylene amine, then blending the polyamidoamine with Bis-hexamethylenetriamine to produce the adhesion promoter.

13 Claims, No Drawings

ANIONIC BITUMINOUS EMULSIONS WITH IMPROVED ADHESION

FIELD OF INVENTION

This invention relates to rapid set, medium set, and slow set anionic emulsions prepared from straight bitumen or bitumen modified by the incorporation of polymers such as styrene butadiene rubbers (SBR), styrene block copolymers (SBS), ethylene vinyl acetate copolymers (EVA), and other suitable modifiers. The invention also relates to emulsions modified by the incorporation of solvents (such as diesel oil or kerosene) or by the addition of polymer latices (such as SBR-latex or natural rubber latex). More particularly, the invention relates to improved methods for enhancing adhesion between asphalt and aggregate in anionic solventless and solvent-containing bituminous emulsions wherein the emulsifiers are alkali earth salts of tall oil fatty acids, fortified tall oil fatty acids, tall oil rosins, and fortified rosins as well as combinations of kraft lignins and nonionic emulsifiers. The adhesion promoting compositions utilized in these improved methods are produced by reacting tall oil fatty acid and/or modified tall oil fatty acid to yield a polyalkylene amine, then blending the polyamidoamine with Bis-hexamethylenetriamine to produce the adhesion promoter.

BACKGROUND OF THE INVENTION

In paving operations, three main practices are employed to achieve thorough mixing of bitumen and aggregate:

(1) mixing of free flowing heated asphalt (asphalt cement) with pre-dried aggregate, (2) mixing pre-dried aggregate with asphalt diluted with a hydrocarbon solvent (i.e., cutback asphalt, cutter stock, etc.) at ambient or slightly elevated temperatures, and (3) mixing aggregate with asphalt emulsions (e.g., oil in water emulsions), obtained by vigorous agitation of asphalt and water in the presence of an emulsifying agent.

The escalating costs of energy and hydrocarbon solvents coupled with a heightened environmental awareness have stimulated increases in the use of emulsified asphalt in the road paving industry. The type of emulsifier employed is determined by the desired application of the asphalt emulsion. For anionic rapid set emulsions (mainly used for chip sealing) and high float emulsions, sodium soaps of tall oil are commonly utilized. For medium set emulsions (applied in cold mixes of virgin aggregate or reclaimed asphalt pavement), higher concentrations of tall oil or modified tall oil soaps are generally being used (with and without the addition of moderate amounts of hydrocarbon solvent). Slow set emulsions with good mix stability in the presence of fine graded aggregate are commonly based upon the use of: a) VINSOL® (a by-product of the wood rosin manufacture), b) fortified tall oil rosin in combination with kraft lignin or lignosulfonates, and c) combinations of kraft lignin or lignosulfonates with nonionic emulsifiers (from the class of ethoxylated alkylphenols, ethoxylated linear or branched fatty alcohols) and ethylene oxide-propylene oxide-block copolymers. In anionic emulsions the asphalt droplets are stabilized by anionic surfactants (wherein their negatively-charged surface migrates to the anode when an electric field is applied).

In the case of rapid set emulsions (mainly used for repair work of old wearing courses) the emulsion is applied on the existing surface and aggregate is spread on top. After the water of the emulsion has evaporated, an intimate matrix of asphalt and stone with good load bearing capacity is formed. The road can be reopened to traffic shortly after application of the seal. Medium set emulsions are commonly being mixed with aggregate in a pug mill prior to being used in road construction. The incorporation of solvent allows the mixes to be stockpiled prior to use. The mixes are prepared in central mixing plants and transported to the job sites or are generated "in-place". Slow set emulsions are being applied where good penetration and wetting is necessary. Mixes with high loadings of fines, base stabilization, and tack coat are the main applications.

Anionic emulsions are taught by Mertens in U.S. Pat. No. 3,062,829 to be prepared via the use of alkali hydroxide which saponify the surface active acids naturally occurring in asphalt. These emulsions contain high molecular weight polyamides (VERSENE®) as viscosity reducers and adhesion promoters. In U.S. Pat. No. 3,108,971 to Mertens, anionic emulsions of the same type are improved with the addition of alkanol amines lacking lipophilic characteristics. Lignin amines are taught by Borgfeldt in U.S. Pat. No. 3,123,569. Quick setting emulsions obtained from highly acidic asphalts using lithium hydroxide are disclosed by Mertens in U.S. Pat. No. 3,240,716. Montgomery and Pitchford teach the alkali metal salts of complex polynuclear aromatic polycarboxylic acids as anionic emulsifiers in U.S. Pat. No. 3,344,082. Heinz in U.S. Pat. No. 3,006,860 employs alkali metal soaps of higher fatty acids (such as those found in tall oil). In U.S. Pat. Nos. 3,956,002 and 4,088,505, Moorer teaches anionic emulsifiers consisting of alkali lignin or oxygenated alkali lignin, an ethylene oxide adduct of alkylphenol, and up to 10% by weight of sodium borate. Detroit describes in U.S. Pat. No. 4,293,459 combinations of partially desulfonated oxygenated lignosulfonates and nonionic surfactants. Schilling et al. disclose the alkali soaps of maleated or fumarated tall oil fatty acids or rosin, of DIACID® 1550, and of sulfonated tall oil fatty acid as emulsifiers for anionic high float emulsions in U.S. Pat. Nos.4,676,927; and the use of carboxyethylated modified tall oil amidoamines as emulsifiers for anionic slurry seal in U.S. Pat. No. 4,561,901. Ferm in U.S. Pat. No. 3,740,344 teaches the preparation of quick set anionic slurry seal compositions by applying a combination of aryl alkyl sulfonates and ethylene oxide adducts of alkyl phenols and of fatty alcohols. Schreuders in U.S. Pat. No. 3,615,796 teaches the use of petroleum sulfonates. A combination of sodium lignate or lignosulfonate and saponified tall oil or rosin is disclosed in U.S. Pat. 3,594,201 by Sommer and Evans. In U.S. Pat. No. 3,350,321, Conn describes the use of alkyl or alkoxy alkyl phosphoric acid salts as emulsifiers for asphalt.

Anionic emulsions are generally prepared at emulsifier concentrations of 0.2–10.0% based on 100% activity, preferentially at 0.2 to 2.0%. The pH range is 7 to 14, preferentially at 10 to 12 in the case of tall oil and rosin soaps. The advantage of anionic emulsions lies in the relatively low cost of tall oil based emulsifiers. The disadvantage is the low bond strength of asphalt to aggregate once the emulsions has dried and formed a film of asphalt on the surface of the aggregate. As most of the aggregates are negatively charged, the electrostatic repulsion between the negatively charged asphalt and the negatively charged stones causes inferior adhesion. Highly acidic aggregates such as quartzite, granite, rhyolite and many of the sedimentary, metamorphic, and igneous rocks are considered responsible for the existing bitumen-stripping problem. This problem is also encountered in hot mix applications and when cut back asphalts are being used.

The quality of the road surface is generally dependent upon the strength of the bonds between the asphalt and the aggregate after curing of the composition. Poor service performance is due to poor adhesion, which results in asphalt stripping off the aggregate surface. Asphalt compositions have relatively poor adhesion to aggregate in the presence of water. Since the aggregate is preferentially wetted by water, the eventual penetration of water into the composition reaches the aggregate and interferes with the bond between aggregate and asphalt. The result of this stripping is flaked pavement and the formation of potholes.

To reduce water-induced debonding of asphalt from the stone surface, in many cases surface-active amines or diamines are added to the asphalt. Generally, anti-stripping agents or adhesion promoters are introduced into the asphalt prior to the asphalt being mixed with the aggregate. In the case of anionic asphalt emulsions it is advantageous to add the additive to the emulsion to prevent degradation at the high pH values. The patent literature sets forth a large number of compounds which can be used to improve adhesion of asphalt to aggregate. These include ethylene oxide condensates of long chain alkyl triamines (U.S. Pat. No. 3,615,797), alkoxylated amines and their salts (U.S. Pat. No. 3,347,690), and reaction products of ozonized unsaturated fatty acids with polyalkylene amines (U.S. Pat. Nos. 3,246,008 and 3,245,451). Other additives are based on fatty carboxylic chromites (U.S. Pat. No. 3,963,509), on combinations of epoxy resins and onium borates (U.S. Pat. No. 3,947,395), on tall oil alkanol amines and amido amines (U.S. Pat. Nos. 2,679,462 and 4,806,166), on fatty ether amines in combination with alkanol amines (U.S. Pat. No. 3,928,061), and on fatty acid amido amine soaps (U.S. Pat. Nos. 2,426,220, 2,891,872 and 3,230,104). Aminoalkyl polyalkoxysilanes are disclosed in U.S. Pat No. 3,861,933; while the condensation products of amines, polyamines, and amides with formaldehyde are taught in U.S. Pat. No. 4,639,273. Mannich reaction products of polyamines with formaldehyde and alkylphenols are described in U.S. Pat. No. 4,789,402; and ethoxylated hexamethylene-diamines and their derivatives are taught in European Patent Application No. 0 077 632 (82305420.0). Fatty primary, secondary and tertiary amines and imidazolines, their reaction products with various acids (including fatty acids), metal soaps, and several other compounds including rosin reaction products are described in U.S. Pat. No. 3,868,263.

One relatively inexpensive class of adhesion promoters which have shown promise for use in hot mix and in cut back asphalts are tall oil-based polyethylene amine condensation products. However, a major problem preventing widespread utilization of such adhesion promoters is that their adhesion efficiencies are not high enough to obtain satisfactory results when they are employed in anionic emulsions.

Therefore, an object of this invention is to solve this major bonding problem by disclosing an improved method for enhancing adhesion between asphalt and aggregate in anionic bituminous emulsions.

A further object of this invention is to improve adhesion between asphalt and traditionally recalcitrant, highly acidic aggregates.

SUMMARY OF THE INVENTION

The objectives of this invention are met by adding an adhesion promoter to the anionic bituminous emulsion. Suitable adhesion promoters are produced by reacting tall oil fatty acid and/or modified tall oil fatty acid with a polyethylene amine to produce a polyamidoamine. The resulting polyamidoamine is subsequently blended with bis-hexamethylenetriamine to produce the adhesion promoting composition.

The improved method for enhancing adhesion between asphalt and aggregate is effective even when utilized with traditionally recalcitrant, highly acidic aggregates. The adhesion promoting effects achieved via the addition of these compositions are primarily due to their ability to migrate to the asphalt/aggregate interphase, where the composition hydrophobizes the aggregate surface and renders it water repellent. In addition, these compositions also increase adhesion by neutralizing some of the negative charges introduced into the asphalt by the anionic character of the emulsifier.

DESCRIPTION OF THE PREFERRED EMBODIMENT

The improved method for enhancing adhesion between asphalt and aggregate in anionic bituminous (asphalt) emulsions comprises the addition to the emulsion of a composition comprising a mixture of:

A) 30–70 percent by weight (wt. %) of the composition of a polyamidoamine condensation reaction product of:

1) 20–80 wt. % of a member selected from the group consisting of tall oil fatty acids, $C_{21}$ dicarboxylic acids, $C_{22}$ tricarboxylic acids, $C_{22}$ tricarboxylic acid anhydrides, and combinations thereof, 2) 80–20 wt. % of a polyethylene amine having a number average molecular weight in the range of about 60 to about 1,000; and 3) up to 5 wt. % of paraformaldehyde; with B) 70–30 wt. % of the composition of bis-hexamethylenetriamine.

A preferred method for enhancing adhesion between asphalt and aggregate in anionic bituminous emulsions comprises the addition to the emulsion of a composition comprising a mixture of:

A) 30–70 wt. % of the composition of a polyamidoamine condensation reaction product of:

1) 2–64 wt. % of a member selected from the group consisting of tall oil fatty acids, $C_{21}$ dicarboxylic acids, $C_{22}$ tricarboxylic acids, $C_{22}$ tricarboxylic acid anhydrides, and combinations thereof;

2) 4–72 wt. % of $C_{36}$ dicarboxylic acid;

3) 80–20 wt. % of a polyethylene amine having a number average molecular weight in the range of about 60 to about 1,000; and 4) up to 5 wt. % of paraformaldehyde; with B) 70–30 wt. % of the composition of bis-hexamethylenetriamine.

If desired, one may replace from about 20–80% of the $C_{36}$ dicarboxylic acid in the above-noted condensation reaction with $C_{54}$ tricarboxylic acid.

The tall oil fatty acids, particularly those containing two olefinic double bonds, may be modified by reaction with acrylic acid, metacrylic acid, fumaric acid and/or maleic anhydride to yield the resulting Diels-Alder cyclo-adducts, or with maleic anhydride via an "ene"-addition reaction. Mono-unsaturated fatty acids also undergo the "ene"-reaction resulting in mono-unsaturated tricarboxylic acid anhydrides. Rosin, which chemically constitutes a mixture of polyunsaturated polycyclic carboxylic acids, also undergoes both the Diels-Alder cycloaddition and "ene"-reaction.

Amidoamines and imidazolines derived from tall oil fatty acids are widely used as antistripping agents in bituminous pavements. The utility of condensation products of dimer acids with polyamines or polyamines and paraformaldehyde as adhesion promoters for anionic asphalt emulsions has been disclosed by Schilling in commonly assigned U.S. patent application Ser. No. 8/719,035 U.S. Pat. No. 5,667, 578 and U.S. Ser. No. 08/731,323 U.S. Pat. No. 5,670,562. Polyamidoamines and imidazolines derived from the modified tall oil fatty acids have been disclosed as emulsifiers for cationic bituminous emulsions by Schilling and Schreuders in U.S. Pat. Nos. 4,447,269, 4,462,840 and 4,547,224 (which are hereby incorporated by reference). First, in a condensation reaction tall oil fatty acid is reacted with acrylic acid, metacrylic acid, fumaric acid and/or maleic anhydride as disclosed in U.S. Pat. No. 3,753,968 and 3,899,467 to Ward, in U.S. Pat. No. 4,081,462 to Powers, in U.S. Pat. No. 3,451,958 to Riedeman et al., and in U.S. Pat. No. 3,712,056 to Crawford. These polycarboxylic acids (anhydrides) are subsequently reacted in a condensation reaction with a polyamine or a blend of polyamines to form the polyamidoamine adhesion promoter.

Bis-hexamethylenetriamine is a by-product produced from the manufacture of hexamethylenediamine (which is frequently used in the production of high molecular weight polymers, such as nylon). Hexamethylenediamine is manufactured commercially from commonly known methods which employ either butadiene-1,3 or acrylonitrile. The resulting hexamethylenediamine is purified by distillation and crude bis-hexamethylenetriamine is left behind as a bottoms product.

The utilization of ethoxylated bis-hexamethylenetriamine as anti-stripping agent for asphalt pavements has been disclosed in European Patent Application No. 82305420.0.

The term "tall oil fatty acid" refers generally to the class of products containing 90% or more fatty acids which are obtained by fractionation of crude tall oil. The fatty acids are primarily a combination of oleic and linoleic acids, with small amounts of saturated and other unsaturated fatty acids. Common impurities include rosin and neutral materials.

Polyethyleneamines which are suitable for the use in these methods have a number average molecular weight in the range of about 60 to about 1,000 (with the preferred range being from 100 to 600) and include many amines capable of forming an amido amine on imidazoline when reacted with the polymer. Such polyethyleneamines include, but are not limited to, the following: aminoethylethanolamine, aminoethylpiperazine, diethylenetriamine, triethylenetetramine, tetraethylenepentamine, hexaethyleneheptamine, bis-aminopropylamine, pentamethylenediamine, hydroxyethylpiperazine, bis-hexamethylenetriamine, homologs, and combinations thereof Suitable ratios the adhesion promoting composition utilized in the present method are 30–70 wt. % polyamidoamine condensation reaction product to 70–30 wt. % of bis-hexamethylenetriamine; with the preferred ration ratios being 40–60 wt. % polyamidoamine to 60–40 wt. % bis-hexamethylenetriamine.

For application purposes, it is preferred to produce adhesion promoters which are liquid in form. It may, therefore, be necessary to adjust the viscosities of certain formulations by the addition of a solvent (a process well within the ability of a skilled artisan). Solvents which are suitable for use in the present methods include, but are not limited to, the following: ethylene glycol, diethylene glycol, polyethylene glycol, propylene glycol, alkanolamines, and combinations thereof. Preferred alkanolamines suitable for use as a solvent include monoethanolamine, diethanolamine, triethanolamine, combinations thereof, and the like.

The following examples are provided to further illustrate the present invention and are not to be construed as limiting the invention in any manner.

EXAMPLE 1

A series of polyamidoamine condensation reaction products were produced via the following method. To a clean 1 liter three-necked flask equipped with agitator, thermometer and reflux condenser with Dean-Stark trap were charged 100–200 parts of tall oil fatty acid containing not more than 5% rosin and 100 parts of a polyamine or polyamine blend. The reaction mixture was heated to 240°–260° C. until all water of condensation was collected (2–4 hrs). Afterwards, the mixture was cooled to 100° C. and discharged. The resulting polyamidoamine condensation reaction products are hereafter referred to as RP#1 and RP#2

To separate 1 liter three-necked reaction flasks, equipped with agitator, thermometer and reflux condenser, was charged 100 parts of RP#1 and RP#2 respectively, which was heated to 50°–100° C. Then 50–150 parts of bis-hexamethylenetriamine (manufactured by DuPont) was added to each flask and stirred for one hour. The resulting adhesion promoting compositions are hereafter referred to as AP#1 and AP#2

EXAMPLE 2

A series of polyamidoamine condensation reaction products were produced via the following method. To a clean 1 liter three-necked flask equipped with agitator, thermometer and reflux condenser with Dean Stark trap were charged 100–200 parts of a blend of tall oil fatty acids and one of the following modified tall oil fatty acids: $C_{21}$-dicarboxylic acid, $C_{22}$-tricarboxylic acid, $C_{22}$-tricarboxylic acid anhydride and 100 parts of a polyamine or blend of polyamines. The reaction mixture was heated to 240°–260° C. for 2–4 hours until all the water of condensation was collected. Afterwards, the mixture was cooled to 100° C. and discharged. Where necessary, sufficient ethylene glycol, propylene glycol or diethylene glycol was added to reduce the viscosity. The resulting amidoamine condensation reaction products are hereafter referred to: RP#3, RP#4, and RP#5

To separate 1 liter three-necked reaction flasks, equipped with agitator, thermometer and reflux condenser, was charged 100 parts of RP#3, RP#4, and RP#2 respectively, which was heated to 50°–100° C. Then 50–150 parts of bis-hexamethylenetriamine (manufactured by DuPont) was added to each flask and stirred for one hour. The resulting adhesion promoting compositions are hereafter referred to as AP#3, AP#4, and AP#5

EXAMPLE 3

A series of polyamidoamine condensation reaction products were produced via the following method. To a clean 1 liter three-necked flask equipped with agitator, thermometer and reflux condenser with Dean-Stark trap were charged 100–200 parts of a blend of tall oil fatty acids and dimerized linoleic acid and 100 parts of a polyamine or blend of polyamines. The reaction mixture was heated to 240°–260° C. for 2–4 hours. After all water of condensation was collected, it was cooled to 100° C. and discharged. Where necessary, the condensation reaction products were diluted with sufficient ethylene glycol, propylene glycol or diethylene glycol to reduce the viscosity. The resulting amidoamine condensation reaction products are hereafter referred to as RP#6, RP#7, and RP#8

To separate 1 liter three-necked reaction flasks, equipped with agitator, thermometer and reflux condenser, was charged 100 parts of RP#6, RP#7, and RP#8 respectively, which was heated to 50°–100° C. Then 50–150 parts of bis-hexamethylenetriamine (manufactured by DuPont) was added to each flask and stirred for one hour. The resulting adhesion promoting compositions are hereafter referred to as AP#6, AP#7, and AP#8

EXAMPLE 4

A series of polyamidoamine condensation reaction products were prepared using the method described in Example 3. In addition to the tall oil dimer acid blends and polyamine noted in Example 3, from 1-5% paraformaldehyde by weight of the polyamine was charged to the reaction flasks. The mixtures were slowly heated to 130°–150° C. for 1 hour. Thereafter, the reaction mixtures were heated to 240°–260° C. for 2–4 hours until all water of condensation was collected. Afterwards, the mixtures were cooled to 100° C. and discharged. Where necessary, sufficient ethylene glycol, propylene glycol or diethylene glycol was added to reduce the viscosity. The resulting polyamidoamine condensation reaction products are hereafter referred to as RP#9 and RP#10.

To separate 1 liter three-necked reaction flasks, equipped with agitator, thermometer and reflux condenser, was charged 100 parts of RP#9 and RP#10 respectively, which was heated to 50°–100° C. Then 50–150 parts of bis-hexamethylenetriamine (manufactured by DuPont) was added to each flask and stirred for one hour. The resulting adhesion promoting compositions are hereafter referred to as AP#9 and AP#10.

EXAMPLE 5

This example illustrates the invention method utilizing the polyamidoamine condensation reaction products and the adhesion promoting compositions produced in Examples 1–4 in anionic emulsions prepared with M28 (a sodium soap of tall oil containing 28% rosin commercially available from Westvaco Corporation), which were combined with granitic aggregate from Georgia and river gravel (quartzite) from South Carolina. An emulsion was prepared from Exxon 85/100 penetration asphalt, 65% asphalt residue using 0.8% tall oil soap (based on the weight of the emulsion) at pH 11.5 in a Gaulin colloid mill. The discharge temperature was 190° F. The emulsion was allowed to cool to 140° F., at which temperature the reaction product or the adhesion promoter (generally 0.3% based on the weight of the emulsion) was added to the emulsion. After one hour the emulsion was used for the coating experiments using granite and quartzite retained on No. 8 U.S. Standard sieve. Sufficient emulsion was applied to achieve uniform coating of the aggregate. The mixes were allowed to dry for two days at ambient temperature.

To determine the efficiency of the methods utilizing the respective adhesion promoters the cured mixes were placed in a basket which was introduced into boiling water for ten minutes. After the basket was removed, the aggregate was spread on a clean paper towel and allowed to cool. The percent retained asphalt coat was judged visually after placing the sample in a shallow glass pan filled with cold water and by illuminating the surface of the coated stones with a 60 Watt lamp. The evaluation results are listed in Table I below.

TABLE I

Evaluation of Adhesion Promoters With Anionic Asphalt Emulsions

| | | | % Coating | |
|---|---|---|---|---|
| Additive | Composition* | % Dosage | Granite | Quartzite |
| None | | 0 | 5 | 0 |
| BHMT | | 0.3 | 80 | — |
| AP#1 | L-5-TEPA(1.5:1) | 0.3 | 80 | 50 |
| RP#1 | L-5-TEPA(1.5:1)/BHMT(1:1) | 0.3 | 92 | 55 |
| AP#2 | L-5-PEHA(1.5:1) | 0.3 | 88 | 50 |
| RP#2 | L-5-PEHA(1.5:1)/BHMT(1:1) | 0.3 | 85 | 80 |
| AP#6 | DTC-155-TETA(1.5:1) | 0.3 | 90 | 85 |
| RP#6 | DTC-155-TETA(1.5:1)/BHMT(1:1) | 0.3 | 92 | 85 |
| AP#7 | DTC-155-TEPA(1.5:1) | 0.3 | 75 | 75 |
| RP#7 | DTC-155-TEPA(1.5:1)/BHMT (1:1) | 0.3 | 85 | 90 |
| AP#8 | DTC 155-Amine Blend(1.75:1) | 0.3 | 30 | 25 |
| RP#8 | DTC 155-Amine Blend(1.75:1)/BHMT(1:1) | 0.3 | 92 | 90 |
| AP#10 | DTC 155-Amine Blend-HCHO (1.5:1:0.1) | 0.3 | 75 | 45 |
| RP#10 | DTC 155-Amine Blend-HCHO (1.5:1:0.1)/BHMT(1:1) | 0.3 | 95 | 90 |
| AP#9 | DTC 195-Amine Blend(1.4:1) | 0.3 | 75 | 50 |
| RP#9 | DTC 195-Amine Blend(1.4:1)/BHMT (1:1) | 0.3 | 95 | 70 |
| AP#3 | Fu-TOFA-Amine Blend(1.1:1) | 0.3 | 80 | 65 |
| RP#3 | Fu-TOFA-Amine Blend(1.1:1)/BHMT(1:1) | 0.3 | 90 | 90 |
| AP#4 | Fu-TOFA-TETA(1:1) | 0.3 | 95 | 90 |
| P#4 | Fu-TOFA-TETA(1:1)/BHMT(1:1) | 0.3 | 98 | 95 |
| AP#5 | Fu-TOFA-TEPA(1:1) | 0.3 | 92 | 90 |
| RP#5 | Fu-TOFA-TEPA(1:1)/BHMT(1:1) | 0.3 | 98 | 95 |
| AP#11 | Ac-TOFA-Amine Blend(1.3:1)/BHMT(1:1) | 0.3 | 90 | 80 |

*Ac-TOFA: tall oil fatty acid reacted with acrylic acid;
Amine Blend: mainly consisting of triethylene tetramine and aminoethyl piperazine;
BHMT: bis-hexamethylenetriamine bottoms (commercially available from DuPont);
DTC-155: tall oil fatty acid containing 50 wt. % dimer/trimer acid (2:1, w/w);
DTC-195: dimer/trimer acid blend (2:1, w/w) containing 5% tall oil fatty acid;
Fu-TOFA: tall oil fatty acid reacted with fumaric acid,
HCHO: formaldehyde
L-5: tall oil fatty acid containing 5% rosin;
PEHA: pentaethylene heptamine;
TEPA: tetraethylene pentamine;
TETA: triethylene tetramine.

The results noted in Table I plainly show the increased efficiency of the methods utilizing the novel adhesion promoters disclosed herein. The adhesion promoting compositions containing the mixture of polyamindoamine and Bis-hexamethylenetriamine exhibited an unexpected synergistic behavior.

It is clear that the methods employing the novel adhesion promoter compositions taught herein achieved superior results when compared to conventional adhesion promoters used for asphalt aggregate compositions. Many modifications and variations of the present invention will be apparent to one skilled in the art in light of the above teaching. It is understood therefore that the scope of the invention is not to be limited by the foregoing description, but rather is to be defined by the claims appended hereto.

What is claimed is:

1. An improved method for enhancing adhesion between asphalt and aggregate in anionic bituminous emulsions wherein the improvement comprises the addition to the emulsion of a composition comprising a mixture of:
   A) 30–70 wt. % of the composition of a polyamidoamine condensation reaction product of:
      1) 20–80 wt. % of a member selected from the group consisting of tall oil fatty acids, $C_{21}$ dicarboxylic acids, $C_{22}$ tricarboxylic acids, $C_{22}$ tricarboxylic acid anhydrides, and combinations thereof;
2) 80–20 wt. % of a polyethylene amine having a number average molecular weight in the range of about 60 to about 1,000; and
3) up to 5% of paraformaldehyde; with B) 70–30 wt. % of the composition of bis-hexamethylenetriamine.

2. The method of claim 1 wherein the composition comprises:

A) 40–60 wt. % of the composition of a polyamidoamine condensation reaction product of:
1) 20–80 wt. % of a member selected from the group consisting of tall oil fatty acids, $C_{21}$ dicarboxylic acids, $C_{22}$ tricarboxylic acids, $C_{22}$ tricarboxylic acid anhydrides, and combinations thereof;
2) 80–20 wt. % of a polyethylene amine having a number average molecular weight in the range of about 60 to about 1,000; and
3) up to 5% of paraformaldehyde; with B) 60–40 wt. % of the composition of bis-hexamethylenetriamine.

3. The method of claim 1 wherein the polyethylene amine has a number average molecular weight in the range of about 100 to about 600.

4. The method of claim 1 wherein the polyethylene amine is a member selected from the group consisting of aminoethylethanolamine, aminoethylpiperazine, diethylenetriamine, triethylenetetramine, tetraethylenepentamine, hexaethyleneheptamine, bis-aminopropylamine, pentamethylenediamine, hydroxyethylpiperazine, bis-hexamethylenetriamine, homologs, and combinations thereof.

5. The method of claim 1 wherein the composition is dispersed in a solvent selected from the group consisting of ethylene glycol, diethylene glycol, polyethylene glycol, propylene glycol, alkanolamines, and combinations thereof.

6. The method of claim 5 wherein the alkanolamine is a member selected from the group consisting of monoethanolamine, diethanolamine, triethanolamine, and combinations thereof.

7. An improved method for enhancing adhesion between asphalt and aggregate in anionic bituminous emulsions wherein the improvement comprises the addition to the emulsion of a composition comprising a mixture of:

A) 30–70 wt. % of the composition of a polyamidoamine condensation reaction product of:
1) 2–64 wt. % of a member selected from the group consisting of tall oil fatty acids, $C_{21}$ dicarboxylic acids, $C_{22}$ tricarboxylic acids, $C_{22}$ tricarboxylic acid anhydrides, and combinations thereof;
2) 4–72 wt. % of $C_{36}$ dicarboxylic acid;
3) 80–20 wt. % of a polyethylene amine having a number average molecular weight in the range of about 60 to about 1,000; and
4) up to 5% of paraformaldehyde; with B) 70–30 wt. % of of the composition of bis-hexamethylenetriamine.

8. The method of claim 7 wherein the composition comprises:

A) 40–60 wt. % of the composition of a polyamidoamine condensation reaction product of:
1) 2–64 wt. % of a member selected from the group consisting of tall oil fatty acids, $C_{21}$ dicarboxylic acids, $C_{22}$ tricarboxylic acids, $C_{22}$ tricarboxylic acid anhydrides, and combinations thereof;
2) 4–72 wt. % of $C_{36}$ dicarboxylic acid;
3) 80–20 wt. % of a polyethylene amine having a number average molecular weight in the range of about 60 to about 1,000; and
4) up to 5% of paraformaldehyde; with B) 60–40 wt. % of the composition of bis-hexamethylenetriamine.

9. The method of claim 7 wherein from about 20–80% of the $C_{36}$ dicarboxylic acid is replaced with $C_{54}$ tricarboxylic acid.

10. The method of claim 7 wherein the polyethylene amine has a number average molecular weight in the range of about 100 to about 600.

11. The method of claim 7 wherein the polyethylene amine is a member selected from the group consisting of aminoethylethanolamine, aminoethylpiperazine, diethylenetriamine, triethylenetetramine, tetraethylenepentamine, hexaethyleneheptamine, bis-aminopropylamine, pentamethylenediamine, hydroxyethylpiperazine, bis-hexamethylenetriamine, homologs, and combinations thereof.

12. The method of claim 7 wherein the composition is dispersed in a solvent selected from the group consisting of ethylene glycol, diethylene glycol, polyethylene glycol, propylene glycol, alkanolamines, and combinations thereof.

13. The method of claim 7 wherein the alkanolamine is a member selected from the group consisting of monoethanolamine, diethanolamine, triethanolamine, and combinations thereof.

* * * * *